United States Patent [19]

Drescher et al.

[11] Patent Number: 4,715,588
[45] Date of Patent: Dec. 29, 1987

[54] ROLLING-TYPE BELLOWS FOR VEHICULAR PNEUMATIC CUSHIONING

[75] Inventors: Gunter Drescher; Gerhard Fankhänel, both of Hanover; Wolfgang Gnirk, Lehrte, all of Fed. Rep. of Germany

[73] Assignee: Continental Gummi-Werke Aktiengesellschaft, Hanover, Fed. Rep. of Germany

[21] Appl. No.: 859,051

[22] Filed: May 2, 1986

[30] Foreign Application Priority Data

May 3, 1985 [DE] Fed. Rep. of Germany ....... 3515942

[51] Int. Cl.$^4$ .............................................. F16F 9/04
[52] U.S. Cl. ...................................... 267/122; 92/92; 92/103 R; 280/712
[58] Field of Search ................. 267/64.24, 64.27, 122, 267/123, 64.21, 64.23, 64.19; 280/711, 712; 92/90, 96, 92, 103 F, 103 SD, 103 R; 74/18.2

[56] References Cited

U.S. PATENT DOCUMENTS

| | | | |
|---|---|---|---|
| 1,637,219 | 7/1927 | Edelmann | 92/92 |
| 2,956,507 | 10/1960 | Hutchinson | 92/92 X |
| 3,549,142 | 12/1970 | Tilton | 267/64.24 |
| 3,645,173 | 2/1972 | Yarlott | 92/92 |
| 4,271,869 | 6/1981 | Weidl et al. | 267/122 X |
| 4,375,182 | 3/1983 | Zavoda | 92/98 R |
| 4,564,177 | 1/1986 | Leonard | 267/64.24 |

FOREIGN PATENT DOCUMENTS 901315 7/1962 United Kingdom ..................... 92/92

*Primary Examiner*—George E. A. Halvosa
*Attorney, Agent, or Firm*—Becker & Becker, Inc.

[57] ABSTRACT

A rolling-type bellows for vehicular pneumatic cushioning systems. In the installed state, support surfaces of the bellows that are adjacent to the end beads thereof are supported against vehicle parts that are movable relative to one another; the axial width of the support surfaces can vary. In the region of the annular support surfaces, the bellows are provided with raised interval axial ribs, which enhance the buckle-free continuous movement of the rolling folds, and reduces wear of the walls of the bellows.

1 Claim, 3 Drawing Figures

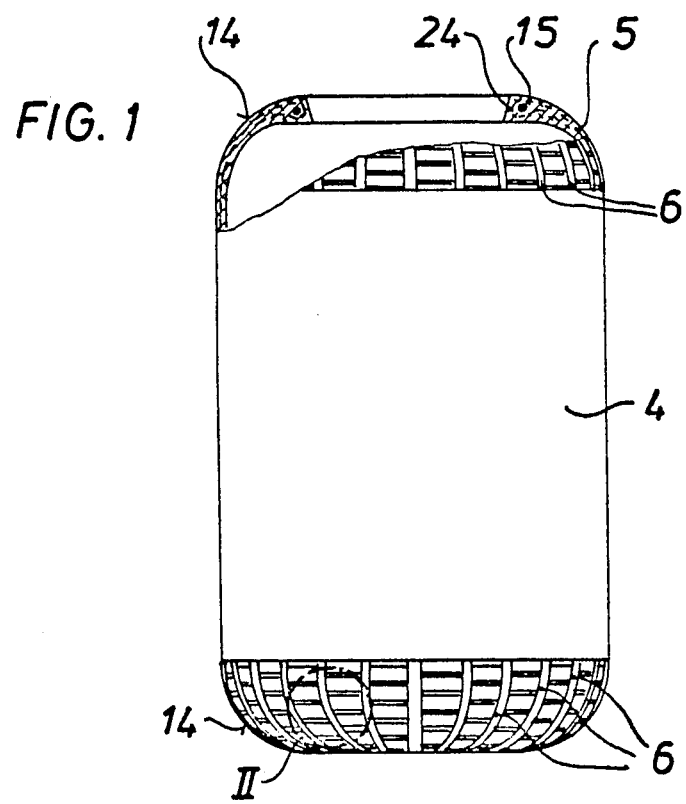
FIG. 1
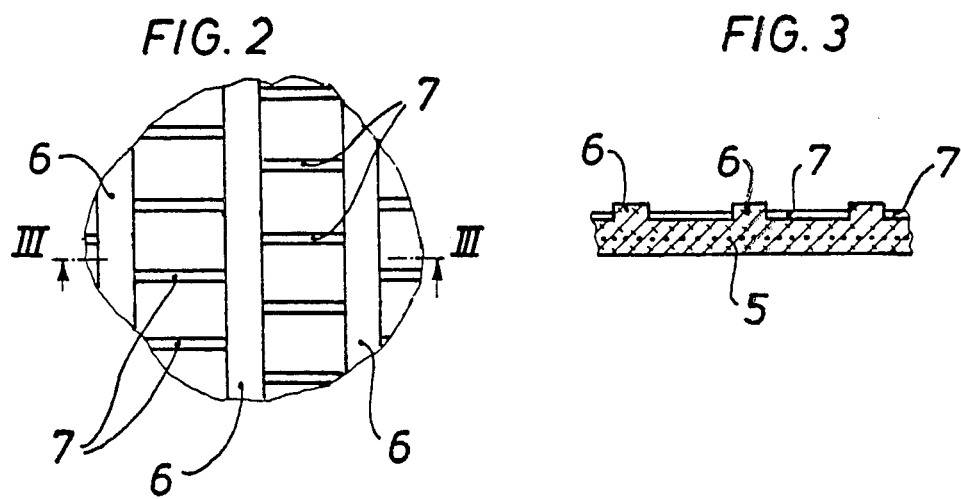
FIG. 2
FIG. 3

ROLLING-TYPE BELLOWS FOR VEHICULAR PNEUMATIC CUSHIONING

BACKGROUND OF THE INVENTION

1. Field of the Invention

The present invention relates to a rolling-type bellows for vehicular pneumatic cushioning or shock-absorption. The bellows is in the form of an essentially cylindrical hose body that is made of rubber or rubber-like synthetic material in which are disposed reinforcing members.

2. Description of the Prior Art

Pursuant to U.S. Pat. No. 3,549,142 Tilton dated Dec. 22, 1970, an air cushioning bellows of this general type is described, with this heretofore known bellows being provided in the region of those end surfaces that contact rigid vehicle parts with peripheral grooves that are formed in the outer wall of the bellows as indentations. The purpose of these grooves is to reduce damaging stresses and automatically repel foreign bodies that enter during the course of the rolling movements. Although this known configuration unquestionably leads to more favorable starting conditions with regard to wear characteristics, and consequently leads to a longer life for such grooved bellows in comparison to conventional smooth-walled rolling-type bellows, nevertheless in practice there still is a desire for further improvements.

It is therefore an object of the present invention, by providing a novel configuration for rolling-type bellows that are used in vehicular pneumatic cushioning systems, to further increase the functional value of such rolling-type bellows with the object of making it possible to have greater load reversal factors up to the point that cracks or tears occur and other fatigue appears.

BRIEF DESCRIPTION OF THE DRAWING

This object, and other objects and advantages of the present invention, will appear more clearly from the following specification in conjunction with the accompanying schematic drawing, in which:

FIG. 1 is a partially broken away sectioned view of one inventive embodiment of a rolling-type pneumatic cushioning bellows in a newly manufactured state;

FIG. 2 is an enlarged view of the dot-dash encircled portion II in FIG. 1; and

FIG. 3 is a cross-sectional view taken along the line III—III in FIG. 2.

SUMMARY OF THE INVENTION

The bellows of the present invention has two oppositely disposed end beads, at least one of which is drawn-in somewhat to provide an opening of reduced diameter, with an annular support surface being provided adjacent to each end bead; in the installed state of the bellows, the annular support surfaces, the width of which can vary, rest against rigid vehicle parts that are movable relative to one another. The inventive bellows is characterized primarily in that raised ribs are integrally provided on the outer surface of the bellows in the region of the annular support surfaces, which are adjacent to the end beads; the ribs extend axially, or at least essentially axially, in other words, the ribs extend from the end beads in a radial direction thereto. Each two adjacent ribs are spaced from one another by a distance corresponding to several times the width of a given one of the ribs. The ribs themselves can have a square or rectangular cross-sectional shape. The height by which the ribs extend beyond the outer wall of the bellows is expediently a fraction of the wall thickness.

The inventive structuring of the surface of the rolling-type bellows in those contact zones thereof that roll on the facing rigid vehicle parts surprisingly has considerable unforeseeable improvements with regard not only to its deformability, but also, when viewed over a long period of time, to its trouble free useful life. This can probably be ascribed to the fact that the walls of the bellows do not in the conventional manner contact the rigid support elements over the entire surface, but rather directly roll on these parts only via the ribs that extend in the direction of movement. As a result, on the one hand, this enhances the kink-free continuous movement of the roll fold, which is curved about a radius, and on the other hand the unavoidable wear is also kept to a minimum; moreover, the increase of mechanically or otherwise caused surface tears is effectively prevented.

Pursuant to a further embodiment of the present invention, it is advisable to integrally form on the wall of the bellows, in the space between adjacent ribs, successive raised surface portions that are uniformly distributed at equal intervals from one another. These raised surface portions are preferably in the form of crosspieces that extend parallel to one another and in the transverse direction relative to the ribs. These crosspieces expediently project beyond the outer wall of the bellows to a lesser extent than do the ribs. The raised surface portions or crosspieces counteract the clogging of foreign bodies, such as, for example, grains of sand or little stones from the pavement, between the ribs, with the accompanying danger of excessive wear and localized destruction of the wall of the bellows.

Further specific features of the present invention will be described in detail subsequently.

DESCRIPTION OF PREFERRED EMBODIMENTS

Referring now to the drawing in detail, the illustrated rolling-type bellows 4 is produced as a cylindrical hose body of oil-resistant rubber provided with embedded reinforcing members 5. At both ends, the bellows 4 has openings that are drawn-in to a smaller diameter via rounded-off portions 14. To secure the bellows on the associated (not illustrated) vehicle parts in a pressure tight manner, the edges of the openings have a greater width in the form of end beads 24. These end beads 24 are reinforced via embedded, pull-resistant core rings 15 that at the same time serve for the anchoring of the reinforcing members 5, which extend over the entire length of the bellows.

In its two end portions, which include the rounded-off portions 14, the otherwise smooth-walled rolling-type bellows 4 is embodied with radial ribs 6 that are integrally formed on the outer wall of the bellows. The ribs 6, which extend directly to the end beads 24, have an approximately rectangular cross-sectional shape. The ribs 6 extend beyond the wall of the bellows to a height of at most aproximately 1 mm. Disposed in the spaces between each two adjacent ribs, are relatively narrow crosspieces 7 that are lower than the ribs 6; these crosspieces 7 are integrally formed onto the bellows wall in the transverse direction. In the illustrated embodiment, adjacent rows of crosspieces are offset relative to one another in the axial direction. However, instead of this offset configuration, it is also possible to have a distribution pattern that is continuous in the circumferential direction. It should be understood that it is also possible, without negatively impacting the effectiveness, to replace the cross-pieces 7 with projections, lugs, or other raised surface configuration. It should be noted that the present invention is equally applicable with bellows where only one end is provided with a bead having a drawn-in diameter.

The present invention is, of course, in no way restricted to the specific disclosure of the specification and drawing, but also encompasses any modifications within the scope of the appended claims.

What we claim is:

1. A rolling-type bellows for vehicular pneumatic cushioning in a direction of movement for a roll fold between support means; said bellows having walls with an outer surface and being in the form of an essentially cylindrical hose body that is made of rubber or rubber-like synthetic material in which reinforcing members are disposed; said bellows in combination further comprises:

two oppositely disposed end beads, at least one of which is drawn-in somewhat to provide an opening of reduced diameter, with an annular support surface being provided adjacent to each of said end beads; in the installed state of said bellows, said annular support surfaces, the width of which can vary, being movable relative to one another; and raised ribs spaced from one another by a distance that corresponds to a multiple of the width of one of said ribs that are integrally provided on the outer surface of said bellows particularly in the region of both said annular support surfaces thereof; said ribs extending at least essentially in the axial direction of said bellows as well as raised surface portions provided as crosspieces extending parallel to one another and at substantially right angles to said ribs in a transverse direction relative to said ribs, said crosspieces projecting beyond the outer wall of the bellows to a lesser extent than do said ribs in the region of both said annular support surfaces; rather than making support surface contact over the entire surface, the walls of the bellows roll directly, as upon rails, on said support means only via said raised ribs that extend in the direction of movement and, as a result, on one hand, there is enhanced kink-free continuous movement of the roll fold, which is curved about a radius, and on the other hand any unavoidable wear is also kept at a minimum and, moreover, any increase of mechanically or otherwise caused surface tears is effectively prevented and for a self-cleaning effect said raised ribs also counteract any clogging of foreign bodies such as grains of sand and little stones between said ribs with avoidance of accompanying danger of excessive wear and localized destruction of the wall of the bellows; each of said ribs having a rectangular cross-sectional shape and each of said ribs projects beyond the outer surface of said bellows to a height that corresponds to a small fraction of the thickness of said hose body that forms said bellows, said surface portions being successively disposed, equidistantly from one another, in a uniform distribution.

* * * * *